US012055163B2

(12) United States Patent
Auvinen et al.

(10) Patent No.: US 12,055,163 B2
(45) Date of Patent: Aug. 6, 2024

(54) PRESSURE MEDIUM CYLINDER AND METHOD FOR MOVING TOOTHED BAR AND WORK MACHINE

(71) Applicant: PONSSE OYJ, Vieremä (FI)

(72) Inventors: Toni Auvinen, Vieremä (FI); Marko Halonen, Vieremä (FI); Tommi Liukkunen, Vieremä (FI)

(73) Assignee: PONSSE OYJ, Vieremä (FI)

( * ) Notice: Subject to any disclaimer, the term of this patent is extended or adjusted under 35 U.S.C. 154(b) by 0 days.

(21) Appl. No.: 17/924,257

(22) PCT Filed: May 11, 2021

(86) PCT No.: PCT/FI2021/050348
§ 371 (c)(1),
(2) Date: Nov. 9, 2022

(87) PCT Pub. No.: WO2021/229150
PCT Pub. Date: Nov. 18, 2021

(65) Prior Publication Data

US 2023/0184268 A1 Jun. 15, 2023

(30) Foreign Application Priority Data

May 14, 2020 (FI) ..................................... 20205483

(51) Int. Cl.
*F15B 15/06* (2006.01)
*F15B 15/02* (2006.01)
*F15B 15/14* (2006.01)

(52) U.S. Cl.
CPC ............ *F15B 15/065* (2013.01); *F15B 15/02* (2013.01); *F15B 15/1419* (2013.01)

(58) Field of Classification Search
CPC .. F15B 15/065; F15B 15/084; F15B 15/1419; F15B 2015/1495
See application file for complete search history.

(56) References Cited

U.S. PATENT DOCUMENTS 3,209,541 A * 10/1965 Dunphy .................. F15B 7/005 92/136
3,537,358 A * 11/1970 Bunyard ............... F15B 15/065 92/136

(Continued)

FOREIGN PATENT DOCUMENTS

CN 103240635 8/2013
CN 209510768 10/2019

(Continued)

OTHER PUBLICATIONS

International Search Report for PCT/FI2021/050348, mailed Aug. 12, 2021, 4 pages.

(Continued)

*Primary Examiner* — Michael Leslie
(74) *Attorney, Agent, or Firm* — Nixon & Vanderhye PC

(57) ABSTRACT

A pressure medium cylinder (1) for moving a toothed bar (3), comprising a toothed bar (3) on at least one side of which is formed a toothing (4). Inside the toothed bar (3), a cavity (6, 6*a*, 6*b*) is formed, extending to at least one end (7*a*, 7*b*) of the toothed bar. The pressure medium cylinder (1) further comprises a longitudinal structure (8, 8*a*, 8*b*), the longitudinal structure (8, 8*a*, 8*b*) and the toothed bar (3) being adapted movably in relation to each other, and the longitudinal structure (8, 8*a*, 8*b*) is adapted at least partly inside said cavity (6, 6*a*, 6*b*). The toothed bar (3) and longitudinal structure (8, 8*a*, 8*b*) are adapted in a sealed manner in relation to each other so that the toothed bar and the longitudinal structure are movable in relation to each other by the effect of a pressure medium.

17 Claims, 6 Drawing Sheets

(56) References Cited

U.S. PATENT DOCUMENTS

| | | | | |
|---|---|---|---|---|
| 4,033,132 | A * | 7/1977 | Priest | B63H 25/36 60/587 |
| 4,545,288 | A * | 10/1985 | Burke | F15B 15/065 92/136 |
| 4,658,487 | A * | 4/1987 | Gachot | B21C 35/026 92/136 |
| 5,076,090 | A * | 12/1991 | Cetnarowski | F01B 9/047 269/227 |
| 6,910,409 | B2 * | 6/2005 | Yamamoto | F01B 9/047 92/136 |
| 10,287,003 | B2 * | 5/2019 | La Commara | F15B 15/1452 |
| 10,590,964 | B2 * | 3/2020 | Magaribuchi | F15B 15/2861 |
| 11,253,973 | B2 * | 2/2022 | Ojalehto | B25B 1/02 |
| 2023/0184268 | A1 | 6/2023 | Auvinen et al. | |

FOREIGN PATENT DOCUMENTS

| | | |
|---|---|---|
| DE | 81 18 213 | 10/1982 |
| DE | 87 00 461 | 4/1987 |
| DE | 100 01 033 | 7/2001 |
| EP | 4 150 220 | 3/2023 |
| FI | 129391 | 11/2021 |
| FR | 2 389 805 | 12/1978 |
| JP | 2003-120608 | 4/2003 |
| JP | 2004-154912 | 6/2004 |
| RU | 2 586 999 | 6/2016 |
| WO | 2021/229150 | 11/2021 |

OTHER PUBLICATIONS

Written Opinion of the ISA for PCT/FI2021/050348, mailed Aug. 12, 2021, 5 pages.

Apr. 21, 2024 Search Report issued in European Patent Application No. 21803510.3, pp. 1-13.

May 2, 2024 Office Action issued in Canadian Patent Application No. 3,182,749, pp. 1-5.

* cited by examiner

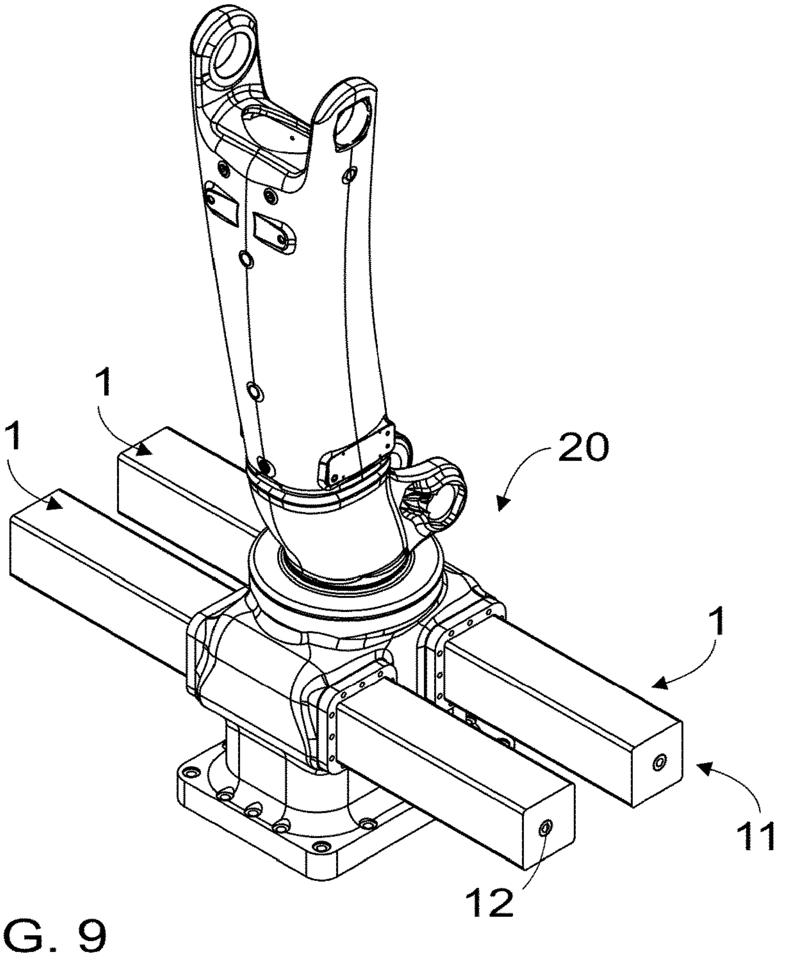

FIG. 9

Moving a toothed bar, on at least one side of which a toothing is formed, and inside which there is adapted a cavity extending to at least one end of the toothed bar, by means of a pressure medium cylinder which comprises a longitudinal structure whereby the longitudinal structure and the toothed bar are adapted movably in relation to each other, and the longitudinal structure is adapted at least partly inside the cavity, and whereby the toothed bar and the longitudinal structure are adapted in a sealed manner in relation to each other so that the toothed bar and longitudinal structure may be moved in relation to each other by the effect of a pressure medium.

110

FIG. 10

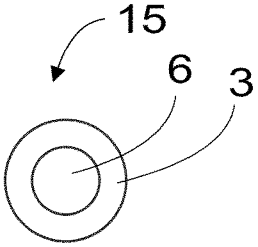

FIG. 11

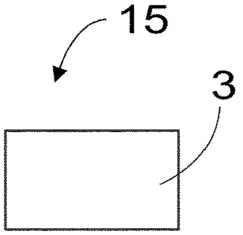

FIG. 12

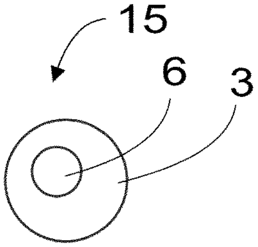

FIG. 13

PRESSURE MEDIUM CYLINDER AND METHOD FOR MOVING TOOTHED BAR AND WORK MACHINE

This application is the U.S. national phase of International Application No. PCT/FI2021/050348 filed May 11, 2021, which designated the U.S. and claims priority to FI Patent Application No. 20205483 filed May 14, 2020, the entire contents of each of which are hereby incorporated by reference.

BACKGROUND

The invention relates to so called toothed bar cylinders and in particular to a pressure medium cylinder and a method for moving a toothed bar. The invention additionally relates to a turning device and a work machine.

Toothed bar cylinders refer to apparatuses in which a toothed bar-like piece is moved with the aid of a pressure medium, in particular with a pressure medium cylinder, in a linear direction, and in which the toothing of the bar-like piece is adapted to engage the toothing of a second piece to move the second piece in question. Such pressure medium cylinders, which may also be referred to as toothed bar cylinders, have been used e.g. in applications where the linear motion of a bar-like piece is transformed into a turning or rotating motion of a second piece by means of a gear transmission between the toothed bar-like piece and a gear adapted to the second piece.

In known solutions, the toothed bar is typically connected to an end of the pressure medium cylinder, in other words successively in series with the pressure medium cylinder. Depending on the application, this has resulted in various problems, such as limitations to the geometry of the pressure medium cylinder, and/or has required special arrangements in the pressure control of the pressure medium system. For example, it may have been necessary to design the working pressure of the pressure medium cylinder used to move a toothed bar to be considerably lower than the working pressure of other actuators, such as a boom structure or another hoisting device. This has required pressure reduction for the pressure medium cylinder used to move the toothed bar. Pressure reduction, in turn, causes losses in pressure medium systems.

BRIEF DESCRIPTION OF THE INVENTION

It is an object of the invention to provide a novel method and an apparatus implementing the method. The object is achieved with a method and a pressure medium cylinder for moving a toothed bar and a work machine comprising such a pressure medium cylinder, which are characterised by what is disclosed in the independent claims. Preferred embodiments are disclosed in the dependent claims.

The solution now disclosed is based on the toothed bar-like piece, i.e. the so-called toothed bar, and the pressure medium cylinder being adapted mechanically within each other, that is, in parallel and not successively as in prior art solutions. One of the advantages of this solution is that the pressure medium cylinder moving the toothed bar and the turning device may be formed shorter in the direction of movement of the toothed bar, because the toothed bar and cylinder need not be adapted one after the other, in other words in series, as has been typically done in the known solutions.

An advantage of the disclosed pressure medium cylinder and method is, for example, that the geometry of the pressure medium cylinder and pressure control of the pressure medium system using it may be designed appropriate from the viewpoint of the purpose of use. For example, there is no more need to modify the pressure level of the pressure medium cylinder in relation to the overall pressure in the pressure medium system. Pressure losses in the pressure medium system may be considerably reduced by not having to reduce the pressure to the pressure medium cylinder for the pressure medium cylinders of turning devices, for example, and in load sensing hydraulic systems, in particular, it is more advantageous when there are no major differences in the pressure levels between functions of the same pressure medium circuit. On the other hand, the structure of the disclosed pressure medium cylinder allows the working pressure of the pressure medium cylinder to be increased and the volume flow to be decreased, which reduces the losses further still.

In addition, the size of the pressure medium cylinder moving the toothed bar need not be defined according to the dimensions of the toothing, but a smaller cylinder, for example, may be used. In this case, cavitation and filling problems potentially associated with larger cylinder diameters may be avoided.

In certain embodiments, an additional advantage is that the contact areas of the toothing may be increased in relation to the overall dimensions of the pressure medium cylinder whereby the surface pressure may be decreased.

BRIEF DESCRIPTION OF THE DRAWINGS

The present solution is now described in closer detail in connection with preferred embodiments and with reference to the accompanying drawings, in which:

FIG. 9 is a perspective view of the turning device of FIGS. 7 and 8;

FIG. 10 shows a method for moving a toothed bar;

FIG. 11 shows a cross-section of a toothed bar as seen from an end of the toothed bar;

FIG. 12 shows a cross-section of another toothed bar as seen from an end of the toothed bar;

FIG. 13 shows a cross-section of yet another toothed bar as seen from an end of the toothed bar.

Figure 1:
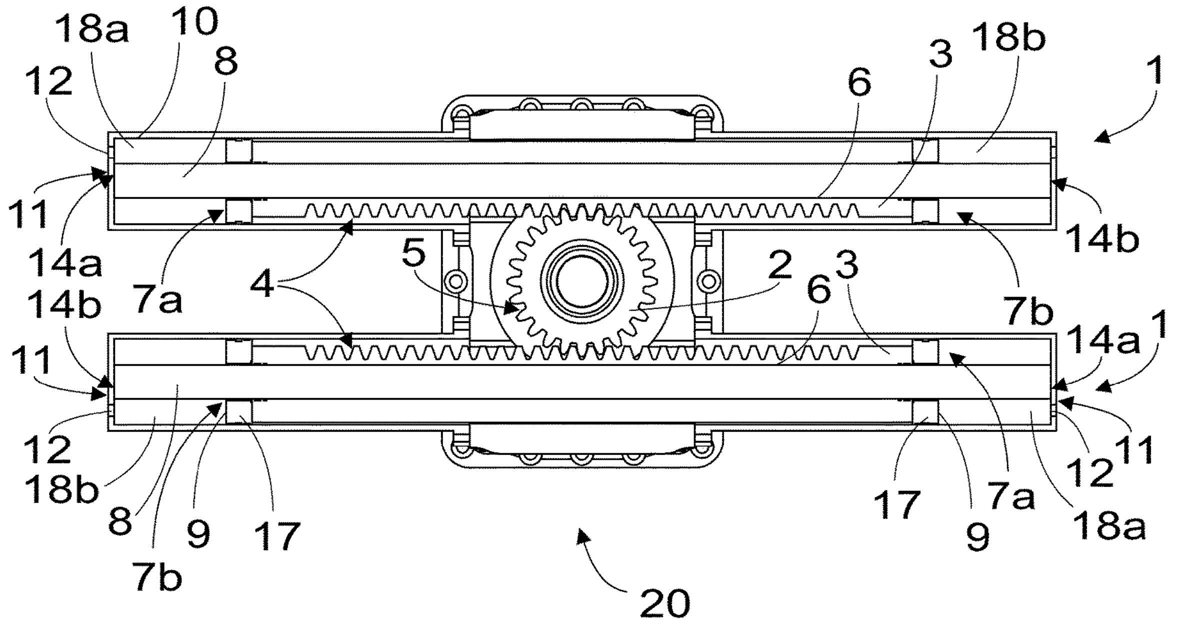
FIG. 1 is a sectional view from above of a first turning device in its usage position.

The figures are intended to illustrate the disclosed solution and some examples of its embodiments. The figures are not shown to scale, and not all of mutually similar features are numbered in all the figures.

DETAILED DESCRIPTION

In this description, the toothed bar 3 generally refers to a bar-like piece in which a toothing is adapted on at least one side or edge. Therefore, a toothing 4 of the toothed bar is adaptable to engage a second toothing 5, such as the toothing of a gear 2. A pressure medium cylinder 1, also referred to as a pressure medium cylinder 1 for moving a toothed bar 3, in this description generally refers to an apparatus comprising a toothed bar 3 adaptable to be moved by the effect of a pressure medium. In other words, the pressure medium cylinder 1 may be configured to move the toothed bar 3. Such pressure medium cylinders may also be referred to as toothed bar cylinders.

In different embodiments, a work chamber with a pressure medium led in it causes the movement of the toothed bar 3 is adapted in different structural ways in relation to the toothed bar 3, which is described more closely in this description and the associated figures. In this description, a turning device 20 refers to an apparatus comprising at least a pressure medium cylinder 1 for moving a toothed bar 3, and a gear 2 adapted for engaging the toothed bar.

In this description, the expression that a structural element is adapted movably in relation to or with respect to a second one, means that one of the structural elements is stationary and the second structural element moves in relation to it, or that both structural elements move in relation to both each other and the environment. For example, a longitudinal structure 8, 8*a*, 8*b* being adapted movably in relation to or with respect to a cavity 6, 6*a*, 6*b* and/or a toothed bar 3, refers to three alternative situations. First of all, the longitudinal structure 8, 8*a*, 8*b* may be stationary and the cavity 6*a*, 6*a*, 6*b* and/or toothed bar 3 may move in relation to the longitudinal structure 8, 8*a*, 8*b*, as is typically the case. Secondly, the cavity 6, 6*a*, 6*b* and/or the toothed bar 3 may be stationary and the longitudinal structure 8, 8*a*, 8*b* may move in relation to the cavity or toothed bar. Thirdly, both the longitudinal structure 8, 8*a*, 8*b* and cavity 6, 6*a*, 6*b* and/or toothed bar 3 may move in relation to the environment and the longitudinal structure 8, 8*a*, 8*b* and cavity 6, 6*a*, 6*b* and/or toothed bar 3 in addition move in relation to each other.

In an embodiment, the pressure medium cylinder may be configured to rotate a gear 2. The pressure medium cylinder 1, in particular, may be configured to rotate the gear 2 by means of a gear transmission formed between a toothing 4 formed in the toothed bar 3 and toothing 5 formed in the gear 2 when the toothing 4 of the toothed bar and the toothing 5 of the gear are adapted to engage each other.

Different gears 2 are known per se and therefore not dealt with in more detail in this description. It will be obvious for a person skilled in the art that the gear 2 may comprise a toothing 5 formed on the surface of a rotatable piece or structural element, or a separate structural element on whose surface a toothing 5 has been formed and which is immovably connected to a rotatable piece or structural element or to cause a rotational movement of the rotatable piece in another manner.

The pressure medium cylinder 1 for moving a toothed bar may comprise a toothed bar 3. The toothed bar 3 may comprise a toothing 4 formed on at least one side of the toothed bar 3. The toothing 4 formed on at least one side of the toothed bar may be configured to engage the toothing 5 of a counterpiece, such as the gear 2 rotated by means of the toothed bar, 3 moved by means of the toothed bar.

Advantageously, the toothed bar 3 is a bar-like piece, but its length and cross-sectional geometry may vary according to the embodiment. In an embodiment, the toothed bar 3 may have a round or circular cross sections, whereby the toothing 4 may be adapted on the outer surface of the toothed bar 3 by, for example, notching the otherwise cross-sectionally round or circular outer surface of the toothed bar 3 or adapted to protrude from the otherwise cross-sectionally round or circular outer surface of the toothed bar 3. In an embodiment, the toothed bar 3 may have a square or rectangular cross section, whereby the toothing 4 may extend on one or more sides of the toothed bar 3. The toothing 4 of the toothed bar is advantageously adapted to extend in the longitudinal direction of the toothed bar 3.

In an embodiment, the pressure medium cylinder 1 may be configured to rotate the gear 2. The toothing 4 formed on at least one side of the toothed bar may in such a case be configured to engage the toothing 5 of the gear 2 being rotated.

In the disclosed solution, inside the toothed bar 3 there is adapted a cavity 6, 6*a*, 6*b* extending to at least one end 7*a*, 7*b* of the toothed bar. The ends 7*a*, 7*b* of the toothed bar are in this case adapted on opposite ends of the toothed bar 3 in its longitudinal direction. In such a case, the toothing 4 of the toothed bar extends between the ends of the toothed bar, that is, between the first end 7*a* and the second end 7*b*. Depending on the embodiment, the toothing 4 of the toothed bar may extend between the ends 7*a*, 7*b* of the toothed bar over the entire length of the toothed bar 3 or over part of the length of the toothed bar.

The pressure medium cylinder 1 according to the disclosed solution further comprises a longitudinal structure 8, 8*a*, 8*b*. The longitudinal structure 8, 8*a*, 8*b* and toothed bar 3 are adapted movably in relation to each other. The toothed bar 3 is advantageously adapted to move in relation to the longitudinal structure 8, 8*a*, 8*b*. The longitudinal structure 8, 8*a*, 8*b* is adapted at least partly within the cavity 6, 6*a*, 6*b*. In other words, the toothed bar 3 is configured to move at least partly around the longitudinal structure 8, 8*a*, 8*b*. The longitudinal axes of the longitudinal structure 8, 8*a*, 8*b*, toothed bar 3, and cavity 6, 6*a*, 6*b* are mutually parallel. The toothed bar 3 and longitudinal structure 8, 8*a*, 8*b* are advantageously adapted in a sealed manner in relation to each other so that the toothed bar and the longitudinal structure are movable in relation to each other by the effect of the pressure medium.

Depending on the embodiment, the sealing may comprise, for example, a structural sealing between the toothed bar 6, 6*a*, 6*b* and the longitudinal structure 8, 8*a*, 8*b*, and/or one accomplished with a separate at least one sealing member. Different means and methods for sealing parts of pressure medium devices are known per se and are therefore not discussed in closer detail herein.

In an embodiment, the toothed bar 3 and longitudinal structure 8, 8*a*, 8*b* are configured to be movable in relation to each other by the effect of a pressure medium led inside the cavity 6, 6*a*, 6*b* and/or by the effect of a pressure medium led to act on the circular surface 9 of an end of the toothed bar, surrounding the cavity. In other words, when such a pressure medium cylinder 1 is used for moving the toothed bar 3, a pressure medium may be led inside the cavity 6, 6*a*, 6*b* whereby the pressure medium adapted in the cavity is configured to cause the movement of the toothed bar 3 in relation to the longitudinal structure 8, 8*a*, 8*b*. In other words, the part of the cavity 6, 6*a*, 6*b* on whose area the longitudinal structure 8, 8*a*, 8*b* does not extend at each time, is adapted to form the work chamber. The cavity 6, 6*a*, 6*b* does not consequently have any longitudinal structure 8, 8*a*, 8*b* at the work chamber. In other words, the work chamber has at least one spot where inside the cavity 6, 6*a*, 6*b*, in a sectional plane transverse in relation to the axial direction, there is no longitudinal structure 8, 8*a*, 8*b*. In such a solution, the work chamber can be sealed relatively easily and simply. Instead of this or in addition to this, when such a pressure medium cylinder 1 is used for moving the toothed bar 3, a pressure medium may be led to the area of at least one end 7*a*, 7*b* of the toothed bar 3 to act on the circular surface 9 surrounding the cavity 6, 6*a*, 6*b* of the end of the toothed bar whereby the pressure medium led to act on this circular surface 9 is configured to cause the movement of the toothed bar 3 in relation to the longitudinal structure 8, 8*a*, 8*b*. In other words, there is at each time adapted, in the area of the end 7*a*, 7*b*, an end chamber 18*a*, 18*b* that is adapted to form the work chamber.

Figure 2:
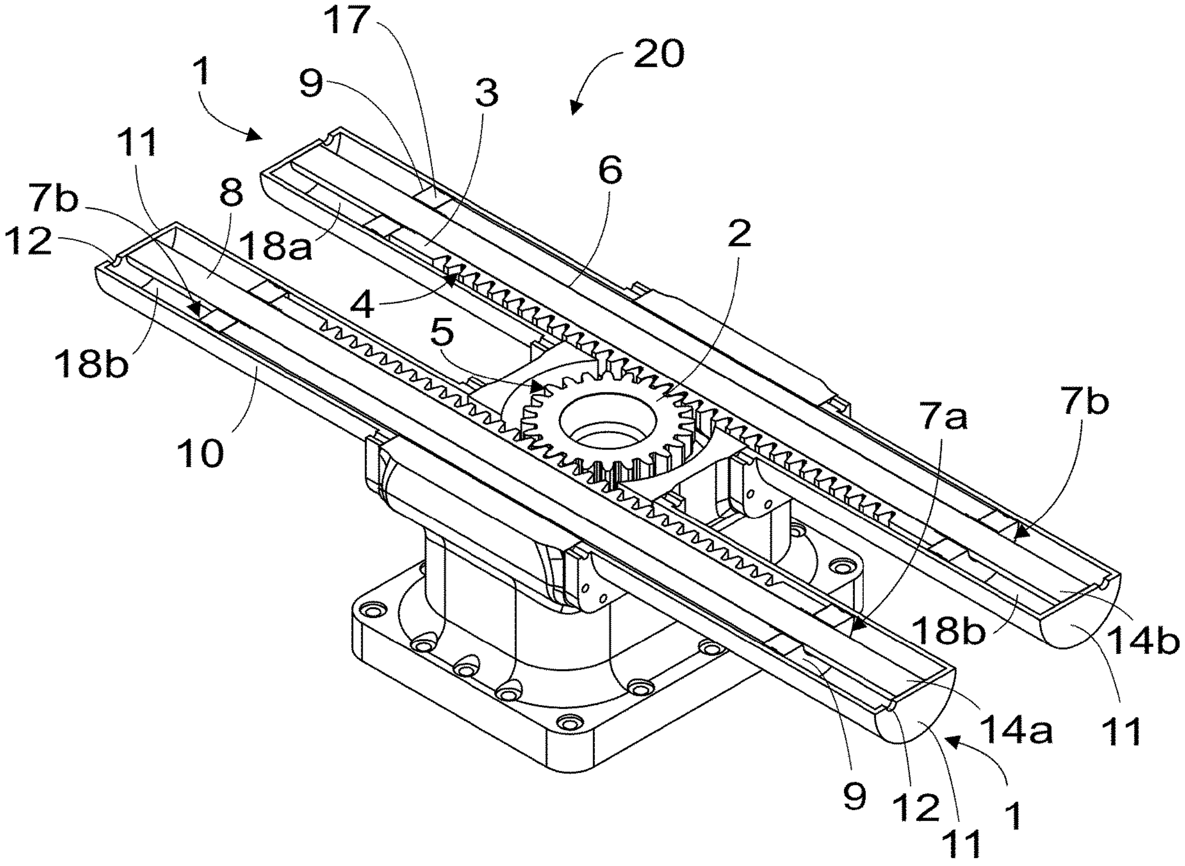
FIG. 2 is a perspective view, partly in cross-section, of the turning device of FIG. 1.
Figure 3:
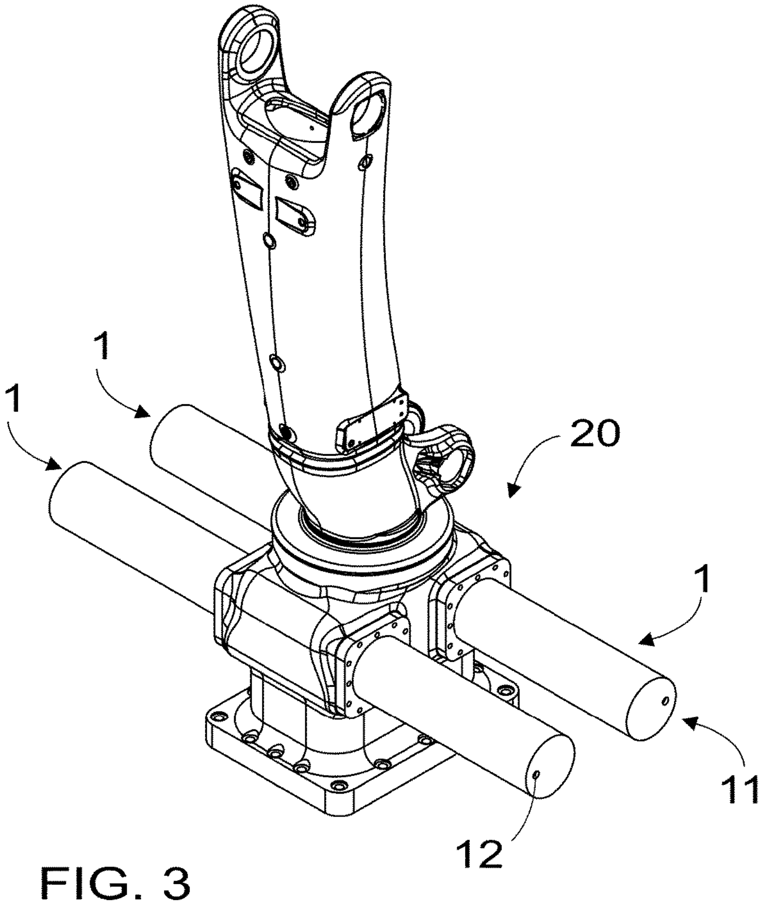
FIG. 3 is a perspective view of the turning device of FIGS. 1 and 2.
Figure 4:
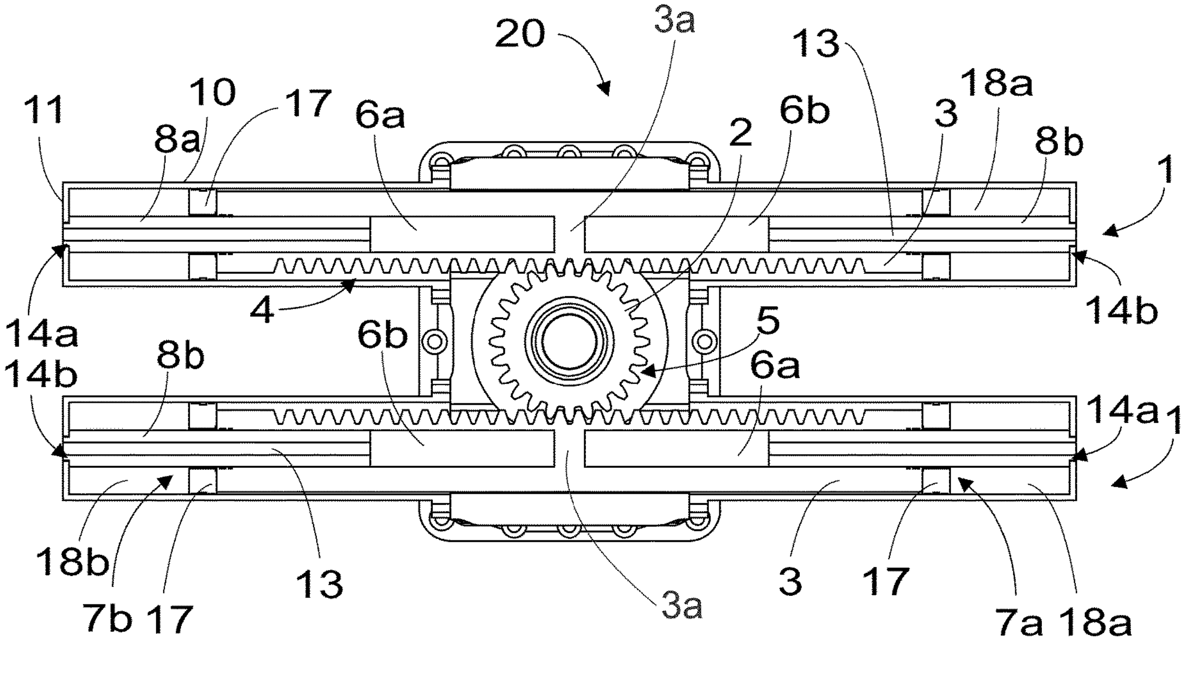
FIG. 4 is a sectional view from above of a second turning device in its usage position.
Figure 5:
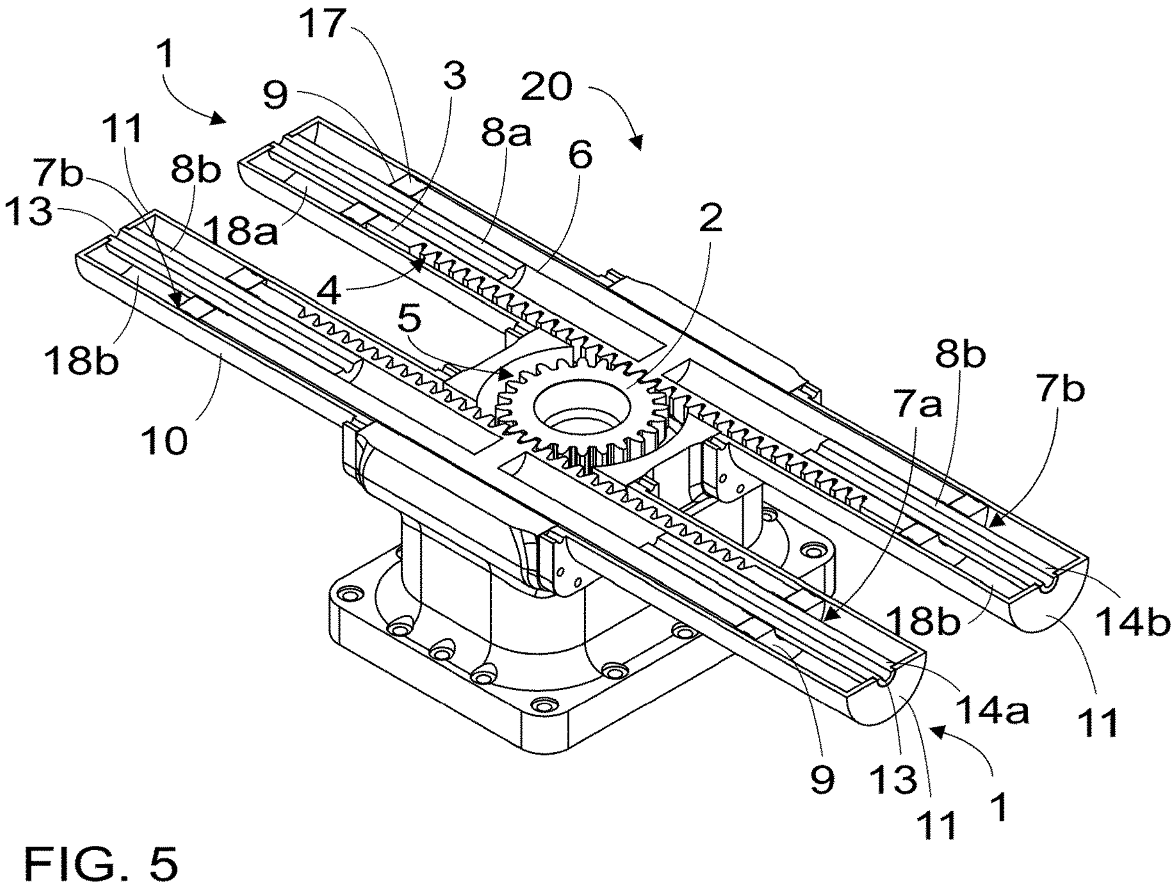
FIG. 5 is a perspective view, partly in cross-section, of the turning device of FIG. 4.
Figure 6:
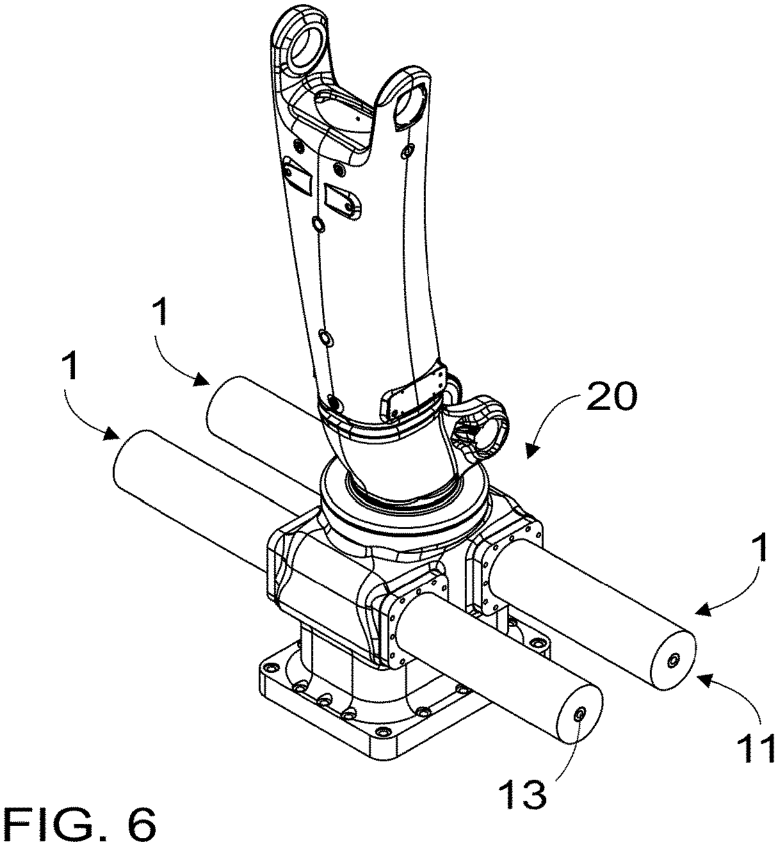
FIG. 6 is a perspective view of the turning device of FIGS. 4 and 5.
Figure 7:
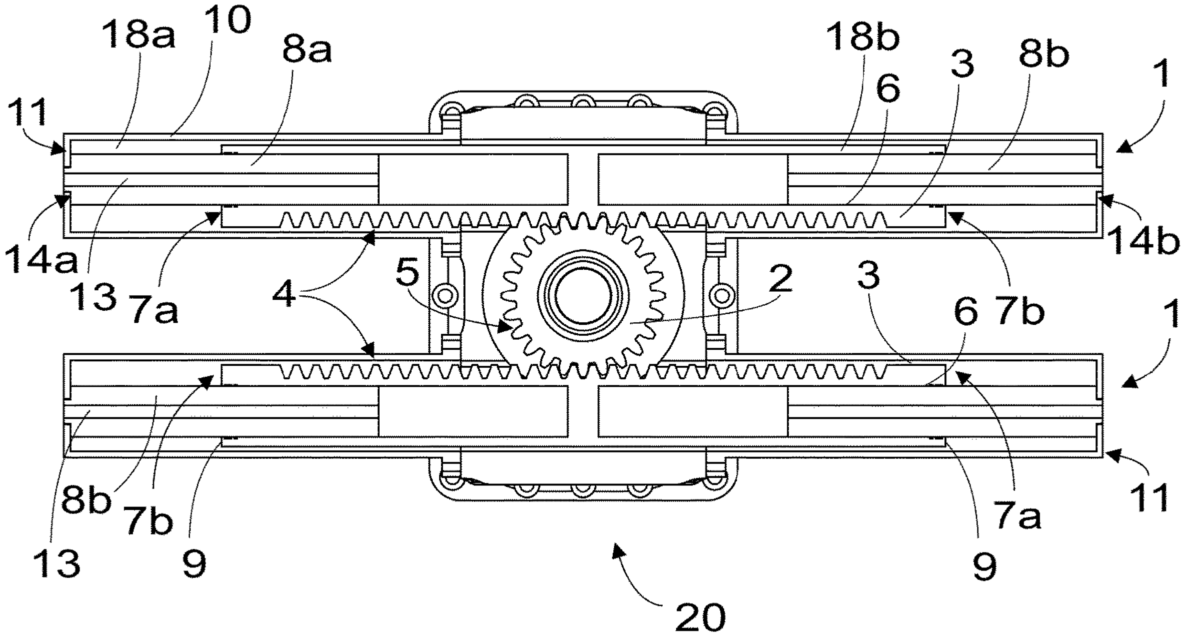
FIG. 7 is a sectional view from above of a third turning device in its usage position.
Figure 8:
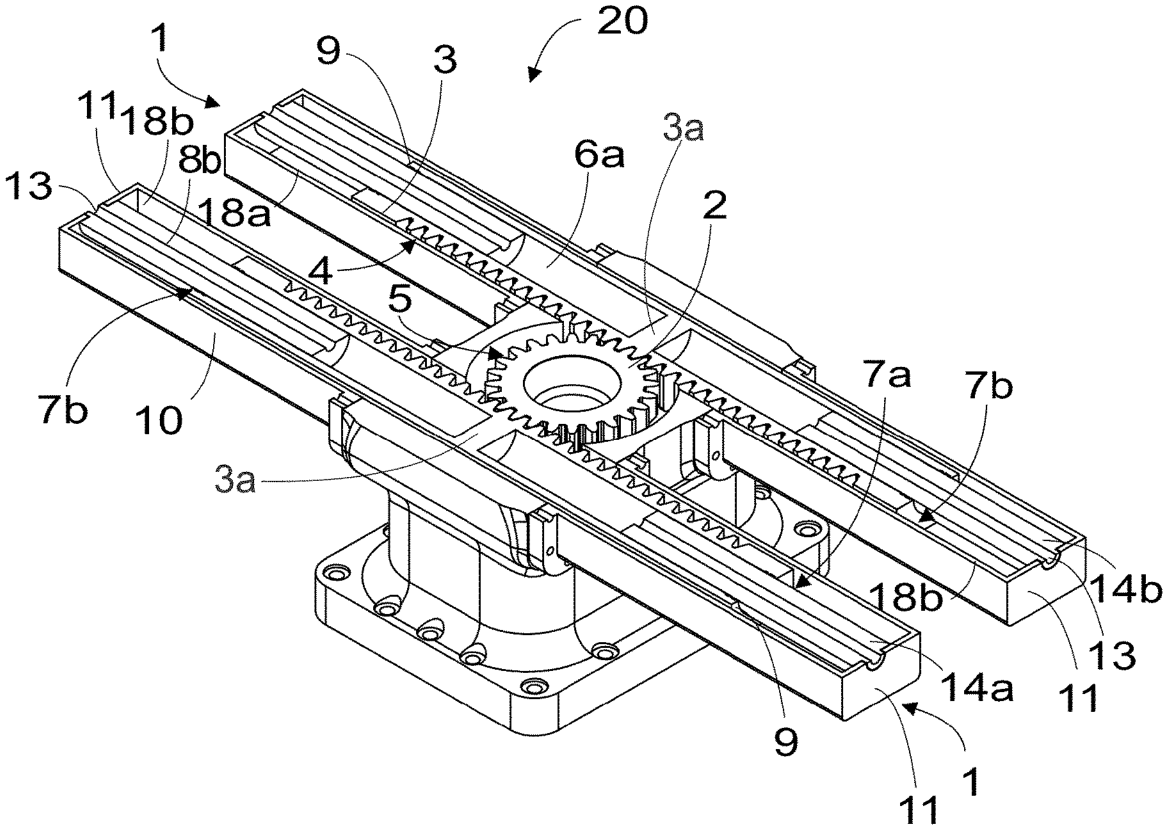
FIG. 8 is a perspective view, partly in cross-section, of the turning device of FIG. 7.
Figure 14:
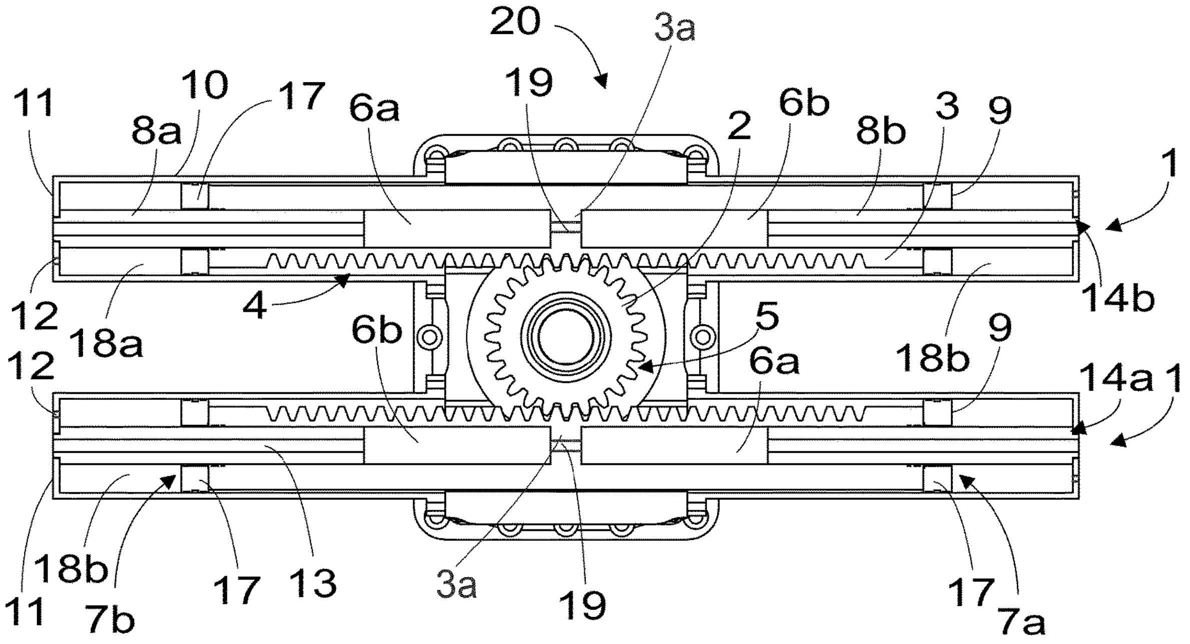
FIG. 14 is a sectional view from above of a fourth turning device in its usage position.

FIGS. 1, 2, and 3 show a first turning device 20 in a usage position at any one time as seen from above as a sectional view, a perspective view partly in section, and in perspective. FIGS. 4, 5, and 6 show a second turning device 20 in a usage position at any one time as seen from above as a sectional view, a perspective view partly in section, and in perspective. FIGS. 7, 8, and 9 show a third turning device 20 in a usage position at any one time as seen from above as a sectional view, a perspective view partly in section, and in perspective. FIG. 14 shows a fourth turning device 20 in its usage position as seen from above as a sectional view. By means of the embodiments shown in FIGS. 1 to 9 and 14, features of the moving method of the toothed bar 3, pressure medium cylinder 1, turning device 20, work machine, and toothed bar have been schematically illustrated.

In an embodiment, there is a cylindrical structure 10 adapted around the toothed bar 3, such as in the embodiments of FIGS. 1 to 9 and 14. To be more specific, the embodiments of FIGS. 1 to 9 and 14 each show two cylindrical structures 10 adapted around the toothed bar 3 so that there is adapted, on each end of the toothed bar 3, at any one time one cylindrical structure 10 as adapted around the toothed bar. In addition, in the embodiments of FIGS. 1 to 9 and 14, there is at any one time shown two toothed bars 3 adapted mutually in parallel, to be more precise adapted on opposite sides of the gear 2. In other embodiments, the pressure medium cylinder 1 may, however, comprise only one toothed bar 3, for example, and one cylindrical structure 10, whereby the cylindrical structure 10 may, depending on the embodiment, be adapted to extend over only one end 7*a*, 7*b* of the toothed bar 3 or as a uniform cylindrical structure 10 over both ends 7*a*, 7*b* of the toothed bar 3.

In an embodiment, the longitudinal structure 8, 8*a*, 8*b* may be adapted in the cylindrical structure 10 adapted around the toothed bar 3 inside the cylindrical structure on at least one end of the cylindrical structure, advantageously at least on the end 11 opposite in relation to the toothed bar 3, immovably, as in the embodiments of FIGS. 1 to 9. In an embodiment (not shown in the drawings), the cylindrical structure 10 may extend as uniform around the toothed bar 3 and over both ends 7*a*, 7*b* of the toothed bar whereby the longitudinal structure 8, 8*a*, 8*b* may be adapted in the cylindrical structure 10 adapted around the toothed bar 3 inside the cylindrical structure, immovably on both ends of the cylindrical structure.

In an embodiment, in the cylindrical structure 10 adapted around the toothed bar 3, a channel 12 may have been adapted to lead a pressure medium between the cylindrical structure 10 and the longitudinal structure 8, 8*a*, 8*b*, as in the embodiment of FIGS. 1 to 3. In this case, the cylindrical structure 10, longitudinal structure 8, 8*a*, 8*b*, and the end 7*a*, 7*b* of the toothed bar 3 may define an end chamber 18*a*, 18*b* in which a pressure medium may be led by means of the channel 12. In such a case, the pressure medium led to the end channel 18*a*, 18*b* may be adapted to act on the circular surface 9. The channel 12 may have been adapted to extend on the surface of the cylindrical structure 10, for example, on at least one end of the cylindrical structure.

In an embodiment, the cylindrical structure 10 may form a cylinder pipe, and the toothed bar 3 may form a piston. In a second embodiment, the cylindrical structure 10 may form a cylinder pipe, and the pressure medium cylinder 1 may comprise a separate piston 17 which is adapted to act on the toothed bar 3. In other words, the separate structural element 17, adapted to act on the toothed bar 3, may in this case form the piston. In this case, the piston 17 may be adapted to act on the toothed bar so that the movement of the piston 17 causes the toothed bar 3 to move. In other words, in the various embodiments, the toothed bar 3 may as such form a piston of the pressure medium cylinder, the pressure medium cylinder 1 may comprise a separate piston 17 adapted to act on the toothed bar 3, whereby the piston 17 may thus be operationally coupled to the toothed bar 3, or the piston 17 and toothed bar 3 may be immovably coupled to each other whereby they may operationally form a uniform structural element.

In an embodiment, the pressure medium led between the cylindrical structure 10 and longitudinal structure 8, 8*a*, 8*b* may be adaptable to move the toothed bar 3 in relation to the longitudinal structure 8, 8*a*, 8*b*.

In an embodiment, such as the embodiments of FIGS. 1 to 3, the cylindrical structure 10 has been adapted around the toothed bar 3, the longitudinal structure 8, 8*a*, 8*b* has been adapted into the cylindrical structure 10 inside the cylindrical structure on at least one end of the cylindrical structure, advantageously on the end 11 of the cylindrical structure, opposite in relation to the toothed bar, immovably, and a channel 12 has been adapted in the cylindrical structure to lead a pressure medium between the cylindrical structure and the longitudinal structure. In such a case, the cylindrical structure 10 is adapted to form the cylinder pipe, and the toothed bar 3 or the separate structural element 17 adapted to act on the toothed bar 3 is adapted to form the piston. In this case, the pressure medium led between the cylindrical structure 10 and longitudinal structure 8, 8*a*, 8*b*, such as into the end chamber 18, 18*b*, is adaptable to move the toothed bar 3 in relation to the longitudinal structure 8, 8*a*, 8*b*. The pressure medium led to the end channel 18*a*, 18*b* may be adapted to act on the circular surface 9.

In an embodiment, such as the embodiments of FIGS. 1 to 6, 11, and 14, the longitudinal structure 8, 8*a*, 8*b* may be adapted concentrically, that is, coaxially, in relation to the toothed bar 3. In such a case, the longitudinal axis of the longitudinal structure 8, 8*a*, 8*b* is adapted to coincide with the longitudinal axis of the toothed bar 3, that is, an axis formed by the centre points of the cross section 15 of the toothed bar. In a second embodiment, such as the embodiments of FIGS. 7 to 9 and 14, the longitudinal structure 8, 8*a*, 8*b* may be adapted eccentrically in relation to the toothed bar 3. This may be advantageous, for example, in embodiments where it is necessary to maximise the toothing size to convey as large forces as possible in relation to the cross section 15 of the toothed bar.

In an embodiment, such as the embodiments of FIGS. 4 to 9 and 14, a channel 13 may have been formed in the longitudinal structure 8, 8*a*, 8*b* to lead a pressure medium into the cavity 6, 6*a*, 6*b*. In this case, the cavity 6, 6*a*, 6*b* may form the cylinder pipe, and the longitudinal structure 8, 8*a*, 8*b* may form the piston whereby the pressure medium led into the cavity 6, 6*a*, 6*b* is adaptable to move the toothed bar 3 in relation to the longitudinal structure 8, 8*a*, 8*b*.

In an embodiment, the pressure medium cylinder 1 may comprise a plurality of work chambers, such as a first end chamber 18*a*, a second end chamber 18*b*, a work chamber formed by the first cavity 6*a* and/or a work chamber formed by the second cavity 6*b*, so that the toothed bar 3 may be adapted to move by leading a pressure medium to at least two of such work chambers so that at least two structures, acting as a piston, are formed. In an embodiment, the pressure medium cylinder 1 may in such a case comprise a channel 12 adapted in the cylindrical structure 10 to lead a pressure medium to at least one cavity 6*a*, 6*b* and a channel 13 formed in the longitudinal structure 8, 8*a*, 8*b* to lead a pressure medium to at least one end chamber 18*a*, 18*b*. In other words, in such an embodiment, both the longitudinal structure 8, 8*a*, 8*b* and the toothed bar 3 or the separate structural element 17 adapted thereto may be adapted to form a piston that causes movement of the toothed bar 3 in relation to the cylindrical structure 10 when a pressure medium is led to the corresponding work chamber, as shown in connection with other embodiments, to establish a working pressure. In the different embodiments, one or more of the chambers of the pressure medium cylinder 1, such as the cavity 6*a*, 6*b* or end chamber 18*a*, 18*b* may be pressurized, and correspondingly one or more of the chambers of the pressure medium cylinder 1, such as the cavity 6*a*, 6*b* or end chamber 18*a*, 18*b* may be unpressurized, for example, connected to a tank line of the pressure medium system, such as a hydraulic system.

In an embodiment, such as the embodiments of FIGS. 4 to 9 and 14, the toothed bar 3 comprises two separate cavities 6*a*, 6*b*, the first of which, cavity 6*a*, is adapted on the first end 7*a* of the toothed bar to extend to said first end 7*a* of the toothed bar, and the second of which, cavity 6*b*, is adapted on the second end 7*b* of the toothed bar to extend to the second end 7*b* of the toothed bar. The first cavity 6*a* is separated from the second cavity 6*b* by a neck 3*a* of the structure of the toothed bar 3. In such a case, there are thus two cavities 6*a*, 6*b* formed in the toothed bar 3, one at each end 7*a*, 7*b* of the toothed bar, so that each of the cavities extends to the toothed bar 3 end in question and opens at this end so that each cavity 6*a*, 6*b* is able to receive at least one longitudinal structure 8*a*, 8*b* at any one time. In an embodiment, such a pressure medium cylinder 1 further comprises two separate longitudinal structures 8*a*, 8*b*, one adapted movably at any one time in one of the two cavities 6*a*, 6*b*.

In an embodiment, such as the embodiment of FIG. 14, the two cavities 6*a* and 6*b* formed in the toothed bar 3 may be adapted to be in a fluid contact with each other. In an embodiment, such a fluid contact between the first cavity 6*a* and second cavity 6*b* may have been formed by adapting a connecting channel 19 in the toothed bar 3, which is adapted to extend from the first cavity 6*a* to the second cavity 6*b*. The connecting channel 19 may be formed in the neck 3*a* of the toothed bar 3. In a second embodiment, the fluid connection between the first cavity 6*a* and second cavity 6*b* may have been formed in another manner, for example, with an external channel or another connection of the toothed bar 3 or the external structure of the pressure medium cylinder 1, for example, in connection with the pressure medium system. In such embodiments, the same pressure prevails in the chambers formed in the cavities 6*a*, 6*b* when a pressure medium is led into them. In an embodiment, the cavities 6*a*, 6*b* are in a fluid connection further to the tank line of the pressure medium system. In such a case, the solution of the embodiment of FIG. 14 allows a similar operation to be achieved as with the embodiments of FIGS. 1 to 3. The pressure medium cylinder 1 may further comprise a channel 12 adapted in the cylindrical structure 10 to lead a pressure medium between the cylindrical structure 10 and longitudinal structure 8, such as the end chamber 18*a*, 18*b* in the embodiment of FIG. 14. In such embodiments, the movement of the toothed bar 3, for example, may be controlled by optimally making use of the pressure medium led to the chambers formed in the cavities 6*a*, 6*b* and the end chambers 18*a*, 18*b*. The pressure medium system 1 may otherwise, where applicable, correspond to the pressure medium cylinder disclosed in this description, for example, the fastening of the longitudinal structure 8, 8*a*, 8*b* to the cylindrical structure 10 may correspond to what was disclosed in another embodiment, the cross section of the toothed bar 3 may be round, oval, or rectangular, and the longitudinal structure 8, 8*a*, 8*b* may be adapted concentrically or eccentrically in relation to the toothed bar 3. In such embodiments, it is possible to form the pressure medium cylinder 1 as a multicylinder structure whereby the torque moving the toothed bar 3, that is, the turning torque in embodiments comprising a turning device 20, may be adjusted as needed also by changing the surface areas and not exclusively with pressure, improving adjustment options.

In an embodiment, not shown in the drawings, the turning device 20 comprises two pressure medium cylinders 1, adapted in parallel, for example, on opposite sides of the gear 2. In such a case, each pressure medium cylinder 1 may comprise one toothed bar 3 which comprises one cavity 6*a*, 6*b*, whereby the cavity 6*a* of the toothed bar 3 of the first pressure medium cylinder 1 is adapted on the first end 7*a* of the toothed bar in question to extend to said first end 7*a* of the toothed bar, and the cavity 6*b* of the toothed bar 3 of the second pressure medium cylinder is adapted on the second end 7*b* of the toothed bar to extend to the second end 7*b* of the toothed bar. In other words, the cavities 6*a*, 6*b* may be adapted on opposite ends of the pressure medium cylinders 1, that is, crosswise in relation to each other. In such a case, there is, in other words, one cavity 6*a*, 6*b* formed in each toothed bar 3, on the mutually opposite ends 7*a*, 7*b* of the toothed bars 3, so that each of the cavities extends to one end of the toothed bar 3 in question at any one time and opens at this end so that each cavity 6*a*, 6*b* is able to receive at least one longitudinal structure 8*a*, 8*b* at any one time. In an embodiment, each of such pressure medium cylinders 1 further comprises at least one longitudinal structure 8*a*, 8*b* adapted movably at any one time in one of the chambers 6*a*, 6*b*. In other words, the longitudinal structures 8*a*, 8*b* are in this case adapted on opposite ends of the pressure medium cylinders, in a mutually crosswise manner in relation to the gear 2 or another rotatable structure.

In an embodiment, not shown in the drawings, the toothed bar 3 comprises one cavity 6 which extends from the first end 7*a* of the toothed bar to the second end of the toothed bar 7*b*. In addition, the pressure medium cylinder 1 may in such an embodiment comprise one longitudinal structure 8 adapted movably in relation to the cavity 6, and at least one cylindrical structure 10. In such a case, the longitudinal structure 8 may be adapted in the cylindrical structure 10 inside the cylindrical structure on at least one end 11*a*, 11*b* of the cylindrical structure immovably. The pressure medium cylinder 1 may further comprise a channel 12 adapted in the cylindrical structure 10 to lead a pressure medium between the cylindrical structure 10 and longitudinal structure 8. In a second embodiment, the pressure medium cylinder may otherwise be similar, but the longitudinal structure 8, 8*a*, 8*b* may be immovably adapted at its both ends 14*a*, 14*b* to the corresponding end 11 of the cylindrical structure 10 at any one time. In such a case, the longitudinal structure 8, 8*a*, 8*b* may extend within the cavity

6, 6*a*, 6*b* from the first end of the cylindrical structure 10 to the second end of the cylindrical structure.

In an embodiment, such as the embodiments of FIGS. 1 to 6, 11, and 14, the cross section 15 of the toothed bar is substantially round. In an embodiment, such as the embodiments of FIGS. 7 to 9, and 12, the cross section 15 of the toothed bar is substantially rectangular, such as square. In the various embodiments, the toothed bar 3 and longitudinal structure 8, 8*a*, 8*b* may be concentrically adapted in relation to each other, such as in the embodiments of FIGS. 1 to 6 and 11, or eccentrically as in the embodiments of FIGS. 7 to 9 and 14.

In an embodiment, the turning device 20 comprises an apparatus comprising at least a pressure medium cylinder 1 for moving the toothed bar 3, and a gear 2 adapted for engaging the toothed bar 3. The pressure medium cylinder 1 may be a pressure medium cylinder according to an embodiment disclosed in this description and/or related to the drawings thereof, or a combination of them. In the various embodiments, the turning device 20 may further comprise other structural elements, for example, to turn the turnable structural element, to adapt the turnable structural element to the turning device, gear, and/or work machine, and to install the turning device to the work machine or another application.

In an embodiment, the turning device 20 may be adapted to turn a first structural element of the work machine in relation to a second structural element of the work machine.

In an embodiment, the turning device 20 may be adapted to turn a boom system or a part thereof. In an embodiment, the boom system may comprise a boom system adapted to a work machine, and the turning device 20 may be adapted to turn the boom system in relation to another structural element of the work machine, such as the body of the work machine or a second structural element. In an embodiment, the turning device 20 may thus be adapted to turn a boom system, or its part, adapted to a work machine in relation to another structural element of the work machine. The use of pressure medium cylinders 1 disclosed in this description and the associated drawings in such turning devices 20 is particularly advantageous, because due to the disclosed pressure medium cylinders 1 the pressure level of the turning device may be adapted the same or nearly the same as that which is used in other actuators of the same pressure medium circuit and/or the same work machine. This way it is, for example, possible to avoid pressure losses caused by changing the pressure, and to simplify systems.

In an embodiment, the work machine may comprise a pressure medium cylinder 1 according to an embodiment disclosed in this description and/or related to the drawings thereof, or a combination of them. In an embodiment, the work machine may comprise a turning device 20 which comprises a pressure medium cylinder 1 according to an embodiment disclosed in this description and/or related to the drawings thereof, or a combination of them, and which is adapted to turn a first structural element of the work machine in relation to a second structural element of the work machine.

In an embodiment, the work machine may comprise a boom system and/or a control cabin, and the turning device 20 may be adapted to turn the boom system and/or control cabin in relation to the body of the work machine or another structural element. In other words, the first structural element of the work machine may in such a case comprise a boom system and/or control cabin, and the second structural element of the work machine may comprise the body or another structural element of the work machine.

In an embodiment, the work machine comprises a turning device disclosed in this description and/or associated drawings. In an embodiment, the work machine may comprise a moving work machine, such as a forestry machine, excavator, transport machine, earth moving machine, mining machine, or a similar work machine used in a business activity, and which is in its entirety movable in relation to the ground or another usage surface. In another embodiment, the work machine may comprise a work machine fixedly and/or immovably adapted in place. Both the moving work machines and work machines fixedly/immovably adapted in place, and their typical structures, are as such generally known and therefore neither them of their structural elements are shown in any greater detail in this description or the associated drawings.

FIG. 10 shows a method for moving a toothed bar. In the method in question, the toothed bar 3 is moved 110 by means of a pressure medium cylinder according to an embodiment disclosed in this description or a combination of them. In an embodiment, the toothed bar 3 is moved by leading a pressure medium inside the cavity 6, 6*a*, 6*b* and/or on the circular surface 9 of an end of the toothed bar, surrounding the cavity, for example, to the end chamber 18*a*, 18*b*, to move the toothed bar 3 in relation to the longitudinal structure 8, 8*a*, 8*b*.

In an embodiment, the pressure medium cylinder 1 is adapted as part of the turning device 20 of the work machine. In such a case, the method may further comprise turning a first structural element of the work machine in relation to a second structural element with said turning device 20.

In an embodiment, the pressure medium cylinder 1 is adapted to operate the turning device 20 of the work machine.

In an embodiment, the toothed bar 3, on at least one side of which a toothing 4 is formed, is moved to engage the toothing 5 of a rotatable gear 2, and inside which a cavity 6, 6*a*, 6*b* is formed, extending to at least one end 7*a*, 7*b* of the toothed bar, by means of a pressure medium cylinder 1 which comprises a longitudinal structure 8, 8*a*, 8*b* whereby the longitudinal structure and the toothed bar are adapted movably in relation to each other and the longitudinal structure is adapted at least partly inside the cavity, and whereby the toothed bar and the longitudinal structure are adapted in a sealed manner in relation to each other so that the toothed bar and longitudinal structure may be moved in relation to each other by the effect of a pressure medium.

Those skilled in the art will find it obvious that, as technology advances, the basic idea of the invention may be implemented in many different ways. The invention and its embodiments are thus not restricted to the examples described above but may vary within the scope of the claims.

The invention claimed is:

1. A pressure medium cylinder configured to move a toothed bar, the pressure medium cylinder comprising the toothed bar on at least one side of which a toothing is formed, wherein:

inside the toothed bar, a cavity is formed, extending to at least one end of the toothed bar, the pressure medium cylinder further comprises a longitudinal structure, wherein the longitudinal structure and the toothed bar are provided movably in relation to each other, and the longitudinal structure is provided at least partly inside said cavity;

there is at each time arranged, on the area of the toothed bar end, an end chamber which is configured to form a work chamber; and the toothed bar and the longitudinal structure are provided in a sealed manner in relation to each other so that the toothed bar and longitudinal structure are movable in relation to each other by the effect of a pressure medium when a pressure medium led to the work chamber causes the toothed bar to move in relation to the longitudinal structure.

2. The pressure medium cylinder as claimed in claim 1, wherein the toothed bar and longitudinal structure are movable in relation to each other by the effect of a pressure medium led inside the cavity and/or by the effect of a pressure medium led to act on a circular surface of an end of the toothed bar, surrounding the cavity.

3. The pressure medium cylinder as claimed in claim 1, wherein:

a cylindrical structure is provided around the toothed bar, the longitudinal structure is provided to the cylindrical structure inside the cylindrical structure on at least one end of the cylindrical structure immovably, and a channel is provided in the cylindrical structure to lead a pressure medium between the cylindrical structure and the longitudinal structure, the cylindrical structure forms a cylinder pipe, and the toothed bar or a separate structural element is configured to act on the toothed bar forming a piston, and a pressure medium led between the cylindrical structure and longitudinal structure is configured to move the toothed bar in relation to the longitudinal structure.

4. The pressure medium cylinder as claimed in claim 3, wherein the longitudinal structure is provided immovably in the cylindrical structure inside the cylindrical structure on the end of the cylindrical structure, opposite in relation to the toothed bar.

5. The pressure medium cylinder as claimed in claim 1, wherein there is formed, in the longitudinal structure, a channel to lead a pressure medium to the cavity such that the cavity forms the cylinder pipe, and the longitudinal structure forms a piston, and wherein a pressure medium led into the cavity is configured to move the toothed bar in relation to the longitudinal structure.

6. The pressure medium cylinder as claimed in claim 1, wherein the toothed bar comprises two separate cavities, the first of which, cavity, is provided on the first end of the toothed bar to extend to said first end of the toothed bar, and the second of which, cavity, is provided on the second end of the toothed bar to extend to the second end of the toothed bar, and wherein the pressure medium cylinder comprises two separate longitudinal structures, one being movable at any one time in one of said the two cavities.

7. The pressure medium cylinder as claimed in claim 1 wherein:

the toothed bar comprises one cavity which extends from the first end of the toothed bar to the second end of the toothed bar, the pressure medium cylinder comprises one longitudinal structure, movable in said cavity, and the longitudinal structure is provided inside a cylindrical structure on at least one end of the cylindrical structure immovably, and wherein there is a channel provided in the cylindrical structure to lead a pressure medium between the cylindrical structure and the longitudinal structure.

8. The pressure medium cylinder as claimed in claim 7 wherein the longitudinal structure is immovably provided at both ends to the corresponding end of the cylindrical structure at any one time, wherein the longitudinal structure extends within the cavity from a first end of the cylindrical structure to a second end of the cylindrical structure.

9. The pressure medium cylinder as claimed in claim 1, wherein the cross section of the toothed bar is substantially round.

10. The pressure medium cylinder as claimed in claim 1, wherein the cross section of the toothed bar is substantially rectangular.

11. The pressure medium cylinder as claimed in claim 1, wherein toothing of the toothed bar is configured to engage toothing of a gear to rotate the gear.

12. A turning device, including an apparatus comprising at least one pressure medium cylinder according to claim 1 configured to move a toothed bar and a gear configured to engage the toothed bar.

13. The turning device as claimed in claim 12, configured to turn a boom system, or part thereof, provided to a work machine in relation to another structural element of the work machine.

14. A work machine comprising a turning device according to claim 12, configured to turn a first structural element of the work machine in relation to a second structural element of the work machine.

15. A method for moving a toothed bar, wherein the toothed bar is moved with a pressure medium cylinder according to claim 1.

16. The method as claimed in claim 15, wherein the toothed bar is moved by leading a pressure medium inside the cavity and/or on the circular surface of an end of the toothed bar, surrounding the cavity, to move the toothed bar in relation to the longitudinal structure.

17. The method as claimed in claim 15, wherein the pressure medium cylinder is provided as a part of a turning device of the work machine, the method further comprising turning a first structural element of the work machine in relation to a second structural element of the work machine with said turning device.

* * * * *